United States Patent
Lee

(10) Patent No.: US 6,788,248 B2
(45) Date of Patent: Sep. 7, 2004

(54) APPARATUS AND METHOD FOR CONTROLLING RECEIVING RATE OF GPS SIGNAL

(75) Inventor: Seong-Ho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/321,559

(22) Filed: Dec. 18, 2002

(65) Prior Publication Data

US 2003/0112175 A1 Jun. 19, 2003

(30) Foreign Application Priority Data

Dec. 19, 2001 (KR) .................................. 10-2001-0081407

(51) Int. Cl.$^7$ ................................................. G01S 5/14
(52) U.S. Cl. ............................. 342/357.02; 342/357.12
(58) Field of Search ........................ 342/357.02, 357.12

(56) References Cited

U.S. PATENT DOCUMENTS

| | | | | |
|---|---|---|---|---|
| 4,809,005 A | * | 2/1989 | Counselman, III | 342/357.12 |
| 4,843,915 A | * | 7/1989 | Sugimura et al. | 477/80 |
| 5,999,126 A | * | 12/1999 | Ito | 342/357.1 |
| 6,448,925 B1 | * | 9/2002 | Shridhara | 342/357.02 |
| 2003/0062957 A1 | * | 4/2003 | Terashima et al. | 331/17 |

FOREIGN PATENT DOCUMENTS

JP 2003115760 A * 4/2003 ............. H03L/7/14

OTHER PUBLICATIONS

NAVSTAR GPS User Equipment Introduction, US Air Force, https://gps.losangeles.af.mil/gpsarchives/1000–public/1300–LIB/reports/..\..\1300–LIB\documents\overviews\ueintropublic_01sep96.pdf, Chapters 1 and 2, Sep. 1996.*

* cited by examiner

Primary Examiner—Bernarr E. Gregory
Assistant Examiner—F H Mull
(74) Attorney, Agent, or Firm—Fleshner & Kim LLP

(57) ABSTRACT

An apparatus and method for controlling a receiving rate of a GPS signal performs position/time control of a mobile terminal for a predetermined time even if the receiving status of the GPS signal is poor, by outputting normal status information and normal GPS data outputted previously. Then, outputting the actual abnormal status information and GPS data after a predetermined time has passed since the output of the normal GPS data.

22 Claims, 3 Drawing Sheets

APPARATUS AND METHOD FOR CONTROLLING RECEIVING RATE OF GPS SIGNAL

BACKGROUND OF THE INVENTION

1. Field of the Invention

The present invention relates to a mobile communication system, and particularly, to an apparatus and a method for controlling a receiving rate of a global positioning system (GPS) signal in order to improve the receiving rate of the GPS signal.

2. Background of the Related Art

FIG. 1 shows a conventional GPS signal receiver. As shown therein, the conventional GPS signal receiver comprises a down converter 10 for converting a global positioning system (GPS) satellite signal (referred to as GPS signal) which is received through an antenna (ANT) into an intermediate frequency (IF) signal; a GPS signal processing unit 20 converting the IF signal into a digital signal and processing the signal by channels (the number of GPS satellites) to output GPS data including time and position data and status information representing normal/abnormal status of the GPS data; a micro processor unit (MPU) 30 for transmitting the GPS data and the status information inputted from the GPS signal processing unit 20 to a clock signal generator 40; a clock signal generator 40 for performing position and time control using the GPS data according to the status data outputted from the MPU 30 and a memory 50.

The GPS signal processing unit 20 comprises an analog/digital converter 1 for converting the IF signal outputted from the down converter 10 into the digital signal; and a data detecting unit 2 for processing the digital IF signal outputted from the analog/digital converter 1 and for outputting the GPS data and the status information.

Operations of the conventional GPS data receiver constructed as above will be described as follows with reference to FIG. 1.

When the GPS signal is received from the GPS satellite, the down converter 10 converts the GPS signal into the IF signal to output the signal to the GPS signal processing unit 20.

The analog/digital converter 1 of the GPS signal processing unit 20 converts the inputted IF signal into the digital IF signal, and the data detecting unit 2 processes the digital IF signal by channels to output the status information representing the normal/abnormal status of the GPS data. That is, the GPS signal processing unit 20 checks the GPS data, and outputs the status information indicating an abnormal status to the MPU 30 when the position and/or time data is abnormal. At that time, the GPS data and the status information outputted from the GPS signal processing unit 20 are temporarily stored in the memory 50.

The MPU 30 outputs the GPS data and the status information outputted from the GPS signal processing unit 20 to the clock signal generator 40, and the clock signal generator 40 checks the inputted status information. The clock signal generator 40 then performs time and position controls using the GPS data. At that time, the clock signal generator 40 masks the position and time data if the status information indicates an abnormal status, and performs position and time control of the mobile terminal using the position and time data if the status information indicates a normal status.

Generally, in an urban area having bad GPS reception, the status information is likely to indicate an abnormal status since the position information is not good. However, once an abnormal status is detected, the clock generator 40 discards all GPS data of the corresponding GPS satellite, that is, discards good time data as well as the inferior position data.

Therefore, according to the conventional GPS receiver, the good time data as well as the inferior position data is discarded when the status information indicates an abnormal status, and therefore, the entire GPS signal receiving rate (usage rate) is lowered and a system error may be caused.

SUMMARY OF THE INVENTION

An object of the invention is to solve at least the above problems and/or disadvantages and to provide at least the advantages described hereinafter.

One embodiment of the present invention provides an apparatus and a method for controlling a receiving rate of a GPS signal to improve the receiving rate.

Another embodiment of the present invention provides an apparatus and a method for controlling a receiving rate of a GPS signal that minimizes system error by improving the receiving rate of the GPS signal.

One embodiment of the present invention includes an apparatus for controlling a receiving rate of the GPS signal comprising: a GPS signal processing unit for detecting GPS data and status information from a GPS satellite signal; a receiving rate controlling unit for forcedly outputting normal status information and GPS data that was outputted previously when the status information detected in the GPS signal processing unit indicates an abnormal status (abnormal status information) and a clock signal generator for performing position/time control of a mobile terminal according to the GPS data and the status information outputted from the receiving rate controlling unit.

Another embodiment of the present invention includes an apparatus for controlling a receiving rate of a GPS signal comprising: a GPS signal processing unit for outputting GPS data and status information by processing a GPS satellite signal; a status detecting unit checking the status information to output the GPS data and the status information outputted from the GPS signal processing unit when the status information indicates a normal status (normal status information) and to output a driving signal for a predetermined time and output GPS data stored in a memory simultaneously when the status information indicates an abnormal status; a normal status generator for generating status information indicating a normal status according to the driving signal; and a counter for counting according to the driving signal to output a time-out signal to the status detecting unit.

Another embodiment of the present invention includes a method for controlling a receiving rate of a GPS signal comprising: detecting GPS data and status information from a GPS satellite signal; checking a status of the detected status information; outputting GPS data and the status information without change when the detected status information indicates a normal status, or forcedly outputting status information indicating a normal status and previous GPS data for a predetermined time when the status data indicates an abnormal status; and performing position/time control of a mobile terminal according to the outputted GPS data and normal status data.

The foregoing and other features, aspects and advantages of the present invention will become more apparent from the following detailed description of the present invention when taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a rough block diagram showing a conventional GPS signal receiver;

FIG. 2 is a block diagram showing an apparatus for controlling receiving rate of GPS signal according to one embodiment of the present invention; and FIG. 3 is a flow chart illustrating a method for controlling a receiving rate of the GPS signal according to one embodiment of the present invention.

DETAILED DESCRIPTION OF PREFERRED EMBODIMENTS

Reference will now be made in detail to the preferred embodiments of the present invention, examples of which are illustrated in the accompanying drawings.

Figure 1:
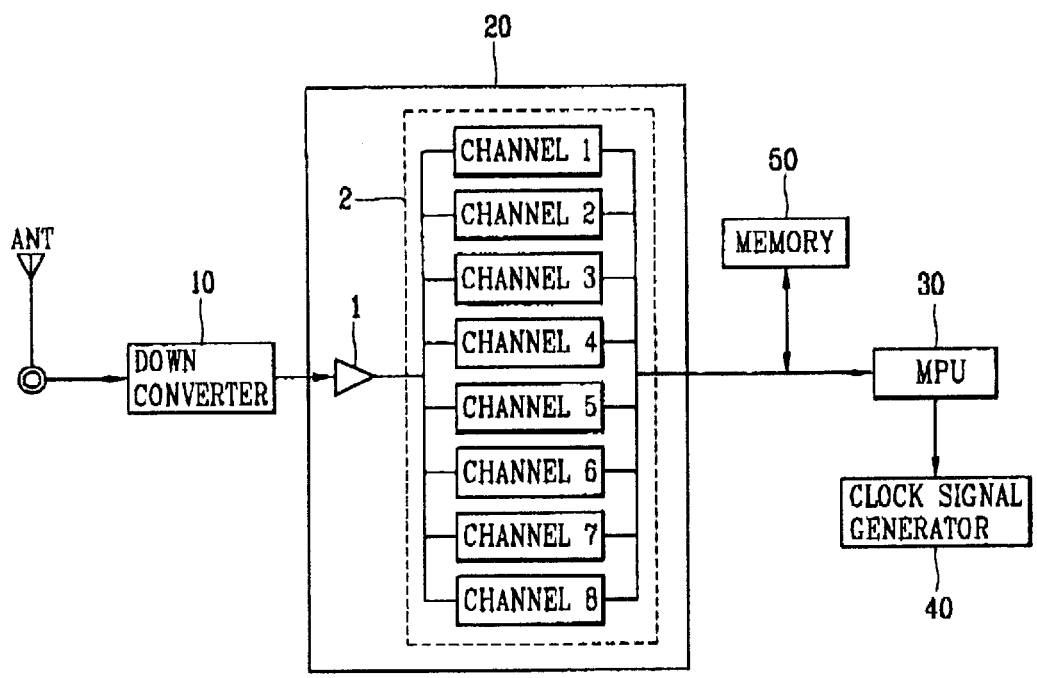
Figure 2:
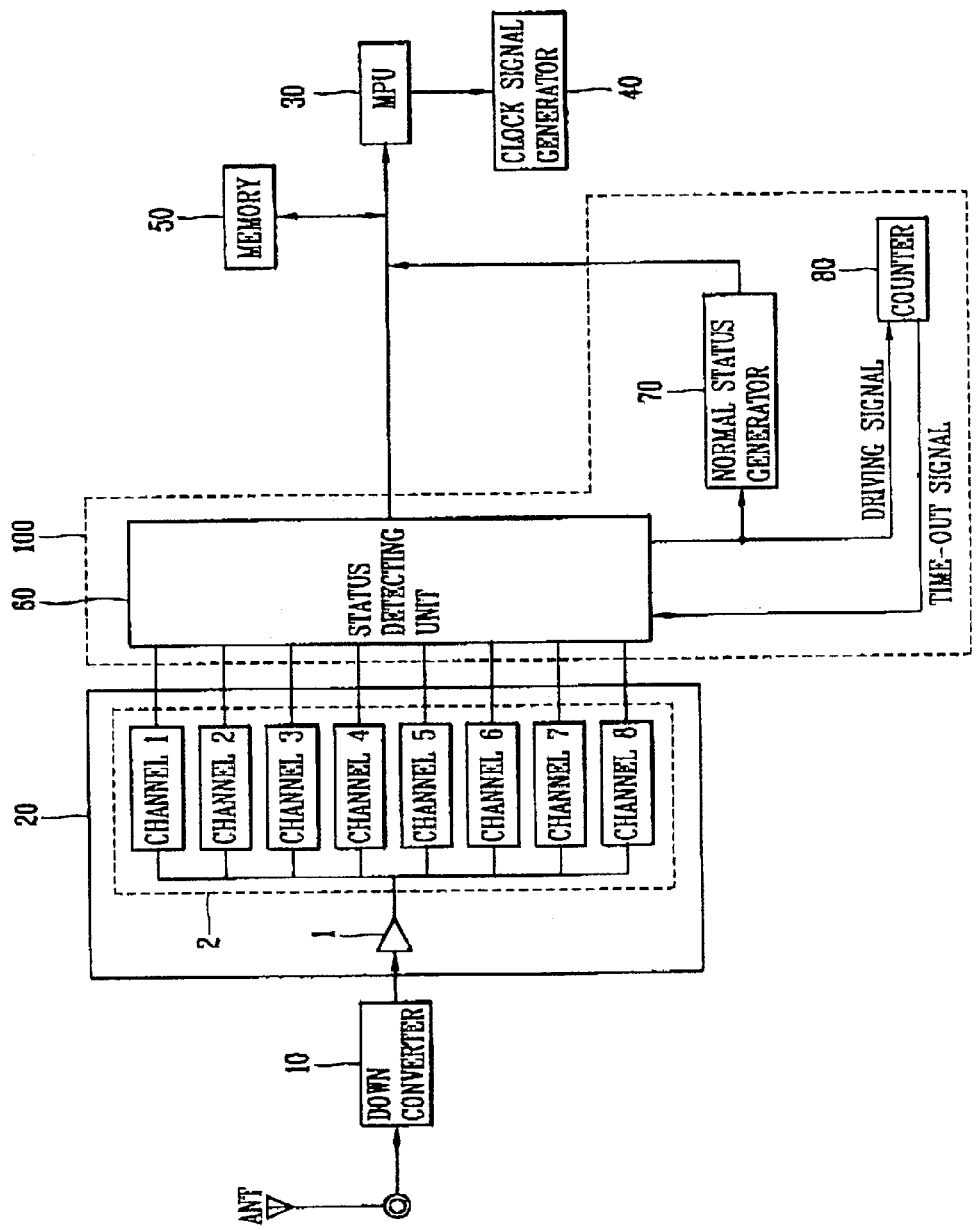
Figure 3:
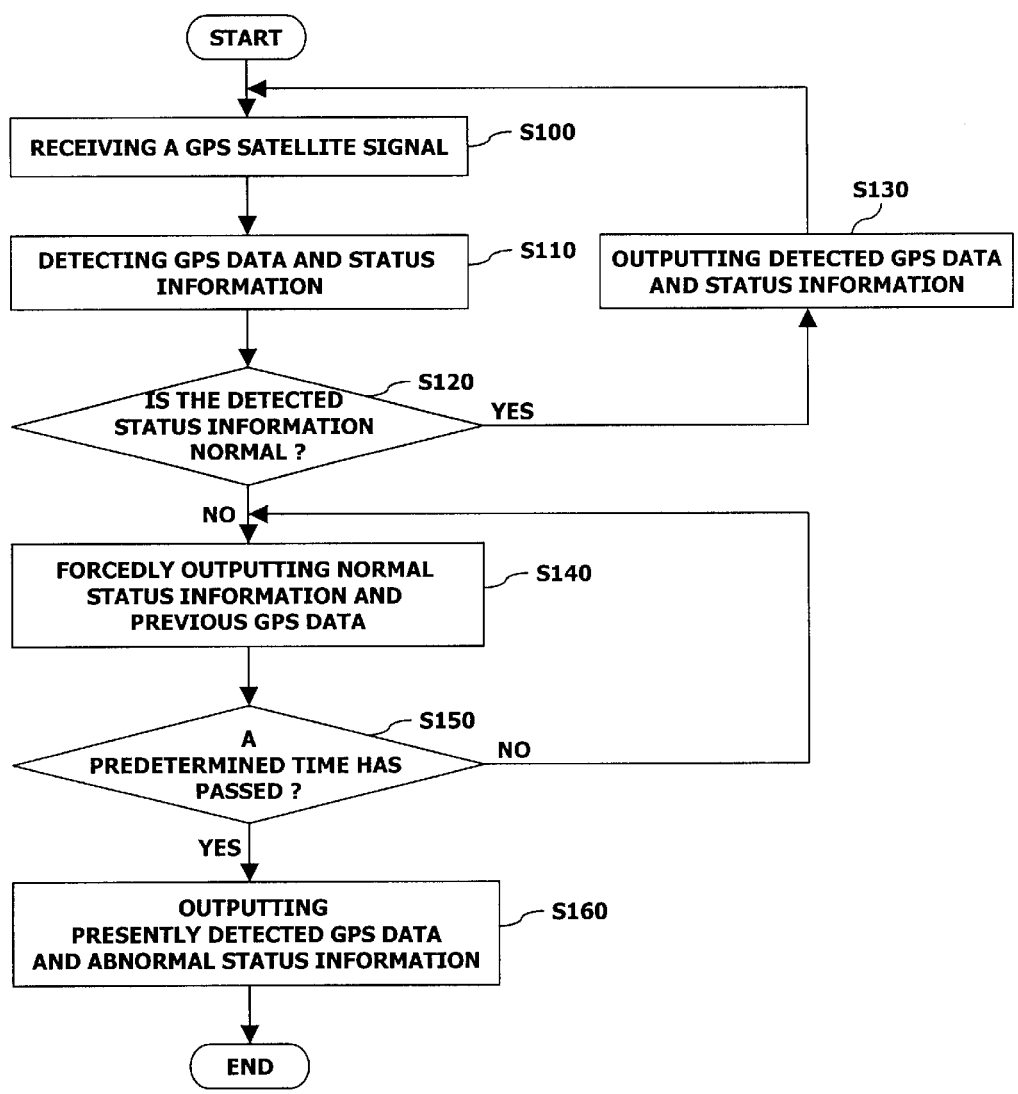

FIG. 2 shows an apparatus for controlling a receiving rate of a GPS signal according to one embodiment of the present invention. The apparatus may also comprise a receiving rate controlling unit 100 besides the conventional GPS data receiver shown in FIG. 1.

The receiving rate controlling unit 100 may comprise a status detecting unit 60 outputting GPS data and status information. The GPS data output from the status detecting unit 60 is the current GPS data output from GPS signal processing unit 20 when the status information indicates a normal status. When the status information indicates an abnormal status, the GPS data output from unit 60 is previous GPS data stored in a memory 50. The previous GPS data is used for a predetermined time during a detected abnormal status. The unit 100 may also include a normal status generator 70 for outputting status information indicating a normal status to an MPU 30 in response to a driving signal from the status detecting unit 60, and a counter 80 for counting an operating time of the status detecting unit 60 and the normal status generator 70. Counter 80 may operate/count time in response to the driving signal from the status detecting unit 60.

Also, the normal status generator 60 and the counter 80 may be in the status detecting unit 60, and the output of the GPS signal processing unit 20 may be inputted into the clock signal generator 40 directly without the MPU 30.

Operation of one embodiment of the apparatus for controlling a receiving rate of the GPS signal will now be described.

When the GPS signal is received from the GPS satellite (S100), the down converter 10 converts the received GPS signal into an IF signal. The GPS signal processing unit 20 converts the IF signal into a digital signal, and processes the signal by channels to detect the GPS data and the status information representing a status of the GPS data (S100).

The GPS data and status information is output from processing unit 20 to the status detecting unit 60. The status detecting unit 60 checks whether or not the status information indicates a normal status (S120). As a result of the checking, when the status information indicates a normal status, the status detecting unit 60 outputs the GPS data and the normal status information from the GPS signal processing unit 20 into the MPU 30 (S130).

If the status information indicates an abnormal status, the receiving rate controlling unit 100 outputs normal status information instead of the abnormal status information to the MPU 30 for a predetermined time, and outputs GPS data previously stored in the memory 50 to the MPU 30 (S140) instead of the currently received GPS data.

That is, when the status information indicates an abnormal status, the status detecting unit 60 reads the previous GPS data from the memory 50, outputs the previous GPS data to the MPU 30, and outputs a driving signal to a normal status generator 70 and a counter 80. At that time, the normal status generator 70 outputs status information indicating a normal status to the MPU 30 in response to the driving signal and the counter 80 starts to count.

The MPU 30 outputs the inputted normal status information and the GPS data to the outer clock signal generator 40. The clock signal generator 40 then performs position and time controls using the GPS data.

After a predetermined time has passed, the receiving rate controlling unit 100 allows the currently detected (instead of the previously stored) GPS data and abnormal status information outputted from the GPS signal processing unit 20 to be input to the MPU 30 (S150 and S160).

Thus, when a time-out signal is outputted from the counter 80 after a predetermined time has passed, the status detecting unit 60 stops generating the driving signal and outputs the abnormal status information and the currently received GPS data inputted through the status detecting unit 60 into the clock signal generator 40. The clock signal generator 40 then performs time and position controls using the GPS data according to the abnormal status information.

As described above, if the status information is abnormal, the normal status information and normal GPS data outputted previously (and stored in the memory) are outputted. Then, the actual abnormal status information and GPS data are outputted after a predetermined time has passed since the output of normal GPS data. Thus, the clock signal generator is able to perform normal operations for a predetermined time even if the receiving status of GPS signal is not good (i.e. abnormal).

As a result, one embodiment of the present invention is able to minimize the system error caused by poor receiving time and/or position data in urban areas and other problem areas or at times when the receiving status of the GPS signal is poor, thus improving the receiving rate (usage rate) of the GPS signal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for processing an input signal, comprising:
   a processor that processes an input signal of a prescribed channel having one of a normal status or an abnormal status:
   a detector circuit that detects whether the input signal has a normal status or an abnormal status; and
   an output generator that generates an output signal based on the input signal, wherein if the detector circuit detects the abnormal status, the output generator uses a previous input signal of the prescribed channel to generate the output signal,
   wherein the processor comprises:
   an analog/digital converter that converts an analog global-positioning system signal to a digital signal; and
   a plurality of data detectors, each of the plurality of data detectors processing the digital signal of a prescribed channel to generate the input signal, and
   wherein the detector circuit comprises:
   a status detector that detects the status of the input signal and generates a prescribed status signal if the abnormal status is detected;
   a status generator connected to the status detector that generates a generated normal status in response to the prescribed status signal; and
   a counter responsive to the prescribed status signal, the counter generating a counter signal after a prescribed period of time.

2. The apparatus of claim 1, wherein the output generator comprises:
   a memory connected to the detector circuit that stores the input signal output from the detector circuit when the detected status is the normal status; and
   the signal generator performs a time and position control on the input signal to generate the output signal.

3. The apparatus of claim 2, wherein the previous input signal is a previously stored input signal of the memory and the detector circuit outputs to the signal generator the input signal when the detected status is the normal status and outputs to the signal generator the previous input signal when the detected status is the abnormal status.

4. The apparatus of claim 3, wherein the detector circuit outputs to the signal generator the input signal when the detected status is the abnormal status in response to the counter signal.

5. The apparatus of claim 4, wherein the status generator outputs the generated normal status to the signal generator in place of the abnormal status of the input signal until the counter signal is generated.

6. An apparatus for controlling a receiving rate of a GPS signal, comprising:
   a GPS signal processing unit for detecting GPS data and status information from a GPS signal;
   a receiving rate controlling unit for forcibly outputting normal status information and GPS data previously outputted for a predetermined time using an output generator that generates an output signal based on an input signal when the detected status information indicates an abnormal status and the output generator uses a previous input signal of a prescribed channel to generate the output signal; and
   a clock signal generator for performing position and time control of a mobile terminal according to the GPS data and the status information outputted from the receiving rate controlling unit.

7. The apparatus of claim 6, wherein the receiving rate controlling unit outputs the detected GPS data and the detected status information front the GPS signal processing unit when the detected status information indicates a normal status.

8. The apparatus of claim 6, wherein the receiving rate controlling unit outputs the detected GPS data and the status information indicating the abnormal status outputted from the GPS signal processing unit after a predetermined time has passed.

9. The apparatus of claim 6, further comprising a memory in which the GPS data and the status information outputted from the GPS signal processing unit are stored temporarily.

10. The apparatus of claim 6, wherein the receiving rate controlling unit comprises:
    a status detecting unit checking the status information output from the GPS signal processing unit and outputting the detected GPS data and the detected status information when the status information indicates a normal status, the status detecting unit outputting a driving signal until a time-out signal is inputted and outputting previously outputted GPS data stored in a memory when the detected status information indicates the abnormal status;
    a normal status generator for generating normal status information in response to the driving signal; and
    a counter performing a counting operation in response to the driving signal and outputting the time-out signal to the status detecting unit.

11. An apparatus for controlling a receiving rate of a GPS signal, comprising:
    a GPS signal processing unit, the GPS signal processing unit receiving GPS data and status information for the GPS signal and outputting the received GPS data and the received status information;
    a status detecting unit coupled to the GPS signal processing unit, the status detecting unit checking a status of the received status information;
    the status detecting unit outputting the received GPS data and the received status information when the status is normal, and outputting a drive signal for a predetermined time when the status is abnormal;
    a memory coupled to the status detecting unit, the memory storing GPS data and outputting the stored GPS data when the status is abnormal;
    a normal status generator coupled to the status detecting unit, the normal status generator generating normal status information in response to the driver signal; and
    a counter coupled to the status detecting unit, the counter performing a count operation in response to the driving signal and outputting a time-out signal.

12. The apparatus of claim 11, wherein the time-out signal is output after the predetermined time to the status detecting unit.

13. The apparatus of claim 12, wherein the memory stops outputting the stored GPS data and the status detecting unit outputs the received GPS data and the received status information in response to the time-out signal.

14. The apparatus of claim 13, wherein the memory stores the received GPS data when the status is normal.

15. A method for controlling a receiving rate of a GPS signal, comprising:
   detecting GPS data and status information in a GPS satellite signal;
   outputting the detected GPS data and the detected status information when the detected status information indicates a normal status, and forcibly outputting generated status information and previous GPS data for a predetermined time when the detected status information indicates an abnormal status; and
   performing position/time control of a mobile terminal according to the outputted GPS data and the outputted status information.

16. The method of claim 15, wherein outputting the GPS data and the status information comprises:
   outputting the detected GPS data and the detected status information when the status information indicates the normal status;
   outputting a driving signal until a time-out signal is inputted and outputting the previous GPS data stored in a memory when the detected status information indicates the abnormal status;
   generating normal status information in response to the driving signal; and
   outputting the time-out signal based on a counting operation performed in response to the driving signal.

17. The method of claim 16, further comprising outputting the detected GPS data and the detected status information when the time-out signal is inputted.

18. An apparatus for processing an input signal comprising:
   a processor that processes an input signal of a prescribed channel having one of a normal status or an abnormal status;
   a detector circuit that detects whether the input signal has a normal status or an abnormal status; and
   an output generator that generates an output signal based on the input signal wherein if the detector circuit detects the abnormal status, the output generator uses a previous data having a normal status within a same data transmission operation to generate the output signal,
   wherein the output generator generates an output signal based on the input signal, and
   wherein if the detector circuit detects the abnormal status, the output generator uses a previous input signal of a prescribed channel to generate the output signal and a receiving rate controlling unit outputs normal status information instead of the abnormal status information to a micro processor unit (MPU) for a predetermined time and outputs GPS data previously stored in a memory to the MPU instead of currently received GPS data.

19. The apparatus of claim 18, wherein the data transmission includes two or more sets of data in a prescribed channel and if one of the sets of data is abnormal, the output generator uses a previous set of data containing normal status information to generate the output signal.

20. The apparatus of claim 18, wherein when the status information indicates an abnormal status, the status detecting unit reads previous GPS data from the memory, outputs previous GPS data to the MPU, and outputs a driving signal to a normal status generator and a counter signal.

21. The apparatus of claim 20, wherein when the MPU outputs inputted normal status information and the GPS data to an outer clock signal generator and the clock signal generator performs position and time controls using the GPS data.

22. The apparatus of claim 21, wherein after a predetermined time has passed, the receiving rate controlling unit allows currently detected instead of previously stored GPS data and abnormal status information outputted from the GPS signal processing unit and input to the MPU.

* * * * *